(12) United States Patent
McCurdy et al.

(10) Patent No.: US 6,742,815 B2
(45) Date of Patent: Jun. 1, 2004

(54) FLUID LINE CONNECTOR ASSEMBLY

(75) Inventors: Todd R. McCurdy, Irwin, PA (US); Alfred Daniel Novak, Jr., Trafford, PA (US); Jerome J. Segal, Pittsburgh, PA (US); Michael Lyon, Pittsburgh, PA (US)

(73) Assignee: Dormont Manufacturing Company, Export, PA (US)

( * ) Notice: Subject to any disclaimer, the term of this patent is extended or adjusted under 35 U.S.C. 154(b) by 0 days.

(21) Appl. No.: 10/141,584

(22) Filed: May 8, 2002

(65) Prior Publication Data

US 2003/0209906 A1 Nov. 13, 2003

(51) Int. Cl.[7] ................................................. F18L 27/00
(52) U.S. Cl. ..................... 285/276; 285/903; 285/222.5
(58) Field of Search ................................ 285/903, 276, 285/222.5

(56) References Cited

U.S. PATENT DOCUMENTS

| | | | |
|---|---|---|---|
| 2,113,211 A | * 4/1938 | Lake ........................ | 285/222.5 |
| 2,420,153 A | 5/1947 | Sprenger et al. | |
| 2,543,088 A | 2/1951 | Woodling | |
| 2,570,406 A | 10/1951 | Troshkin, et al. | |
| 2,867,242 A | 1/1959 | Harris, et al. | |
| 3,055,682 A | * 9/1962 | Bacher et al. .............. | 285/276 |
| 3,086,556 A | 4/1963 | Kanter | |
| 3,600,009 A | 8/1971 | Shupper | |
| 4,369,911 A | 1/1983 | Blumenberg | |
| 4,445,332 A | 5/1984 | Thies et al. | |
| 4,817,996 A | * 4/1989 | Fouts ........................ | 285/276 |
| 4,907,830 A | 3/1990 | Sasa et al. | |
| 5,201,554 A | 4/1993 | Gagg et al. | |
| 5,308,123 A | 5/1994 | Zorn | |
| 5,333,918 A | 8/1994 | Crout et al. | |
| 5,423,578 A | * 6/1995 | Kanomata et al. .......... | 285/903 |
| 5,441,312 A | * 8/1995 | Fujiyoshi et al. ........... | 285/903 |
| 5,478,122 A | 12/1995 | Seabra | |
| 5,553,893 A | * 9/1996 | Foti ............................ | 285/903 |
| 5,653,480 A | * 8/1997 | Mine et al. .................. | 285/276 |
| 5,803,511 A | 9/1998 | Bessette | |
| 5,819,807 A | 10/1998 | Reed | |
| 5,988,226 A | * 11/1999 | Matthews ................. | 285/222.5 |
| 6,016,842 A | 1/2000 | Rooke | |
| 6,019,399 A | 2/2000 | Sweeney | |
| 6,102,445 A | 8/2000 | Thomas | |
| 6,217,082 B1 | 4/2001 | Orcutt et al. | |
| 6,276,728 B1 | 8/2001 | Treichel | |
| 6,354,332 B1 | 3/2002 | Burkhardt et al. | |

\* cited by examiner

*Primary Examiner*—David Bochna
(74) *Attorney, Agent, or Firm*—Fay, Sharpe, Fagan, Minnich & McKee, LLP (57) ABSTRACT

A fluid line connector assembly for connecting between two fluid transmission lines or between a transmission line and an appliance or other apparatus, such as a commercial fryer. The assembly includes a length of thin-walled, flexible tubing having helical corrugations extending therealong and opposing non-corrugated and generally cylindrical ends. A braided sheath extends along the exterior of the tubing and is secured at the tubing ends. A base ring is received on a tubing end and includes a first groove. An end fitting, including an interior passage having a second groove, is retained on and cooperable with the tubing end due to a retaining ring captured within a portion of each groove, allowing the end fitting to remain rotatable relative to the tubing. One or more o-rings are compressively positioned between the end fitting and the tubing end to form a fluid-tight seal therebetween.

32 Claims, 10 Drawing Sheets

FLUID LINE CONNECTOR ASSEMBLY

BACKGROUND OF THE INVENTION

This invention relates to the art of fluid line connector assemblies and, more particularly, to thin-walled, flexible fluid line connector assemblies for use in low-pressure applications, such as for connecting between a gas supply line and a stationary or movable gas appliance, a commercial fryer, for example.

Thin-walled, flexible fluid line connector assemblies have been provided heretofore and generally include a length of thin-walled, corrugated, flexible tubing having opposing non-corrugated tubing ends, a braided sheath supported on the outside of the flexible tubing and secured thereto adjacent the tubing ends, a flare nut retained on each tubing end and a flare fitting cooperable with each flare nut to form a fluid-tight seal therewith. The tubing ends commonly include a generally cylindrical journal portion and a radially outwardly extending flare portion, with the cylindrical journal portion spaced axially inwardly from the flare portion. The braided sheath may be secured to the flexible tubing by any suitable method. For example, a cylindrical inner collar may be fitted onto the cylindrical journal portion of the tubing end prior to the formation of the flare portion. An end of the braided sheath may then be positioned along a portion of the outer surface of the inner collar. A braid retaining collar can then be positioned radially adjacent the braided sheath opposite the inner collar, and crimped radially inwardly to compressively capture the braid against the inner collar. Alternatively, the end of the braided sheath may be soldered, brazed, welded or otherwise fused to a portion of the flexible tubing.

The flare nuts are retained on the non-corrugated tubing ends by the flare portion which is deformed radially outwardly after assembly with the sheath, inner collar, retaining collar and flare nut to engage the flare nut and thereby prevent removal thereof from the length of tubing. To form a fluid-tight seal between the flare nut and the flexible tubing, a flare fitting is threadably engaged into the flare nut. The flare fitting includes a frustoconical leading surface, which compressively engages the flare portion of the tubing end. As the flare fitting and flare nut are threadably tightened together, the frustoconical leading surface of the flare fitting displaces the flare portion of the flexible tubing against an interior surface of the flare nut. This displacement causes the flare portion of the tubing to be compressively engaged between the flare fitting and flare nut, and causes a metal-to-metal seal to form between the tubing, the flare fitting and the flare nut such that the assembly becomes fluid tight.

A disadvantage of connector assemblies of the foregoing nature is that tightening the flare nut and flare fitting together to form the metal-to-metal seal with the flexible tubing causes the flare fitting, flare nut and flexible tubing to become rotatably fixed relative to one another. As such, the flare fitting and flare nut are not able to rotate relative to the thin-walled, flexible tubing. As a result, the flexible tubing can become torsionally stressed during the installation of the connector assembly, such as installation between a gas supply line and a commercial, gas appliance.

Known fluid line connector assemblies are commonly used to form a fluid-tight connection between a gas supply line and a commercial food preparation appliance, such as a fryer. These commercial appliances are often movable to permit cleaning beneath and behind the appliance. As such, the fluid line connector assembly extending between the gas supply line and the appliance is often disconnected to facilitate this mobility of the appliance. To minimize the introduction of torsional stresses from repeated connection and disconnection of the connector assemblies, a quick connect fitting is often installed on at least one of the ends thereof. In certain installations desiring mobility of the appliance without need for disconnection of the connector assembly, swivel fittings may be installed on one or both ends of the assembly. However, each of these foregoing connector assemblies undesirably includes an additional threaded connection or joint which can be the source of leaks.

As mentioned above, the flare fitting and flare nut are threadably connected together to form a metal-to-metal seal with the flexible tubing. Opposite the threaded portion of the flare fitting that engages the flare nut is a male or female pipe thread that would otherwise threadably engage the corresponding thread on the gas supply line or appliance, for example. As such, at least two threaded connections are used at each end of the gas line connector assembly. If additional connecting devices, such as quick-connect fittings or multi-plane swivel fittings, are installed, three or more threaded connections may be used. The more threaded connections that are used, the greater the opportunity for the development of leaks.

Also, connections between end fittings are generally not seamless. Rather, there are normally edges on the fittings, and an axial gap between the fittings that opens radially outwardly from the fluid passages that extend through the fittings. The gap creates an annular cavity that disrupts the flow of fluid between the passages in the fittings. Furthermore, the gaps and edges cause resistance to fluid flow between the passages. Therefore, each additional fitting added to an end of the connector assembly, and the attendant gap and edges from the fitting, causes an increase in the resistance to fluid flow through the completed assembly.

BRIEF SUMMARY OF THE INVENTION

In accordance with the present invention, a thin-walled, flexible fluid line connector assembly is provided that avoids or minimizes the problems and difficulties encountered in connection with connector assemblies of the foregoing nature while promoting an increase in performance and reliability, and maintaining a desired simplicity of structure, economy of manufacture and ease of installation.

More particularly in this respect, a fluid line connector assembly is provided for use in connecting between two fluid lines or a fluid line and an appliance or other device, such as between a gas supply line and a commercial, gas fryer. The fluid line connector assembly includes a length of flexible tubing having a substantially cylindrical tubing end, a base ring supported on the tubing end with a first groove extending radially inwardly from the exterior of the base ring, an end-fitting body having an interior passage extending therethrough with a second groove radially extending into the body from the interior passage, a retaining ring and a sealing member, such as an o-ring. The end-fitting body is positioned along the end of the tubing adjacent the base ring such that the first and second grooves are axially aligned with one another and each groove can receive at least a portion of the retaining ring. The sealing member is positioned between the interior passage of the end-fitting body and the associated tubing end.

Preferably, the length of flexible tubing in the connector assembly will include two generally cylindrical and non-corrugated tubing ends, each having a base ring, an end-fitting body, a retaining ring and one or more sealing members. A braided sheath extends along the exterior of the flexible tubing between the tubing ends. The sheath is secured to each base ring by a braid retaining collar that is crimped to compress a portion of the sheath between the collar and the base ring. The end fittings may include male threads, female threads, or both, or alternatively may be a component of an end connector, such as a swivel fitting or a quick-connect fitting. In any case, however, the end fitting remains rotatable relative to the flexible tubing even after assembly and installation between a gas supply line and a commercial appliance, for example.

DETAILED DESCRIPTION OF THE INVENTION

Figure 1:
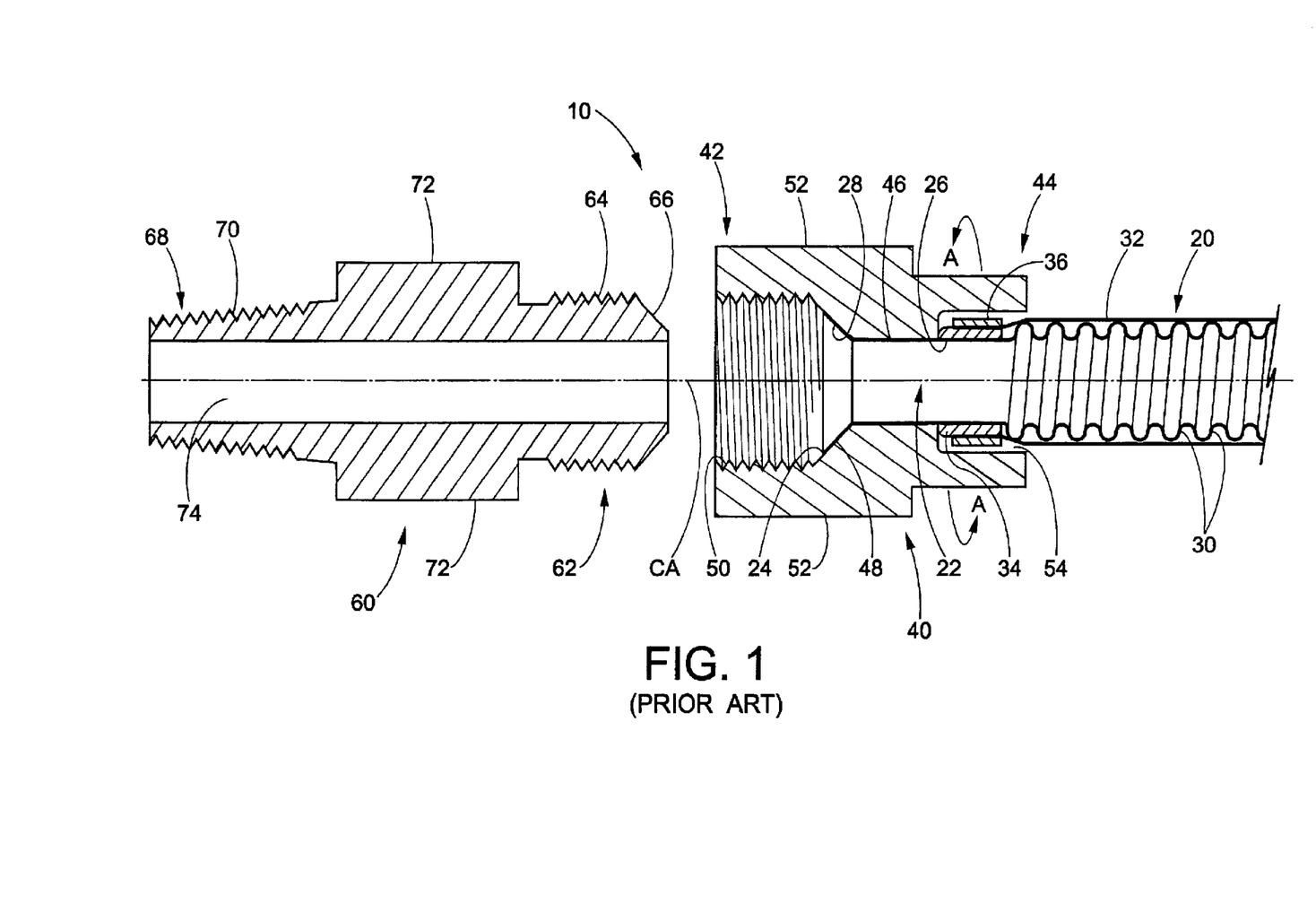
FIG. 1 is a cross-sectional view of a conventional connector assembly shown partly assembled.
Figure 2:
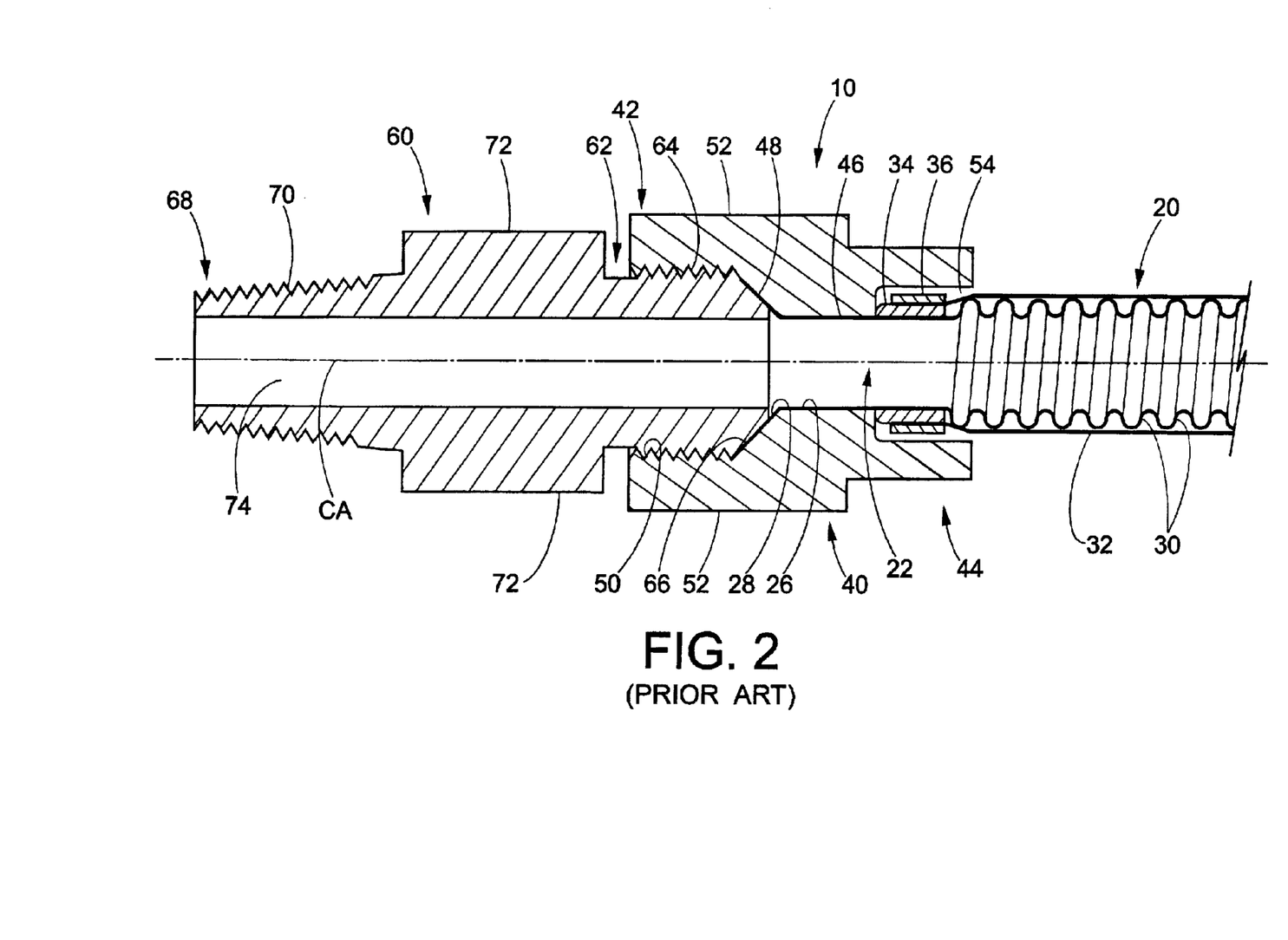
FIG. 2 is a cross-sectional view of the conventional assembly of FIG. 1 shown fully assembled.

It will be appreciated that FIGS. 1 and 2 respectively illustrate a conventional fluid line connector assembly for connection between two fluid transmission lines or a fluid transmission line and an appliance or other device, such as between a gas supply line and a commercial, gas fryer, for example. Such fluid line connector assemblies are generally known by those skilled in the art, and the following discussion of FIGS. 1 and 2 is merely provided to establish background environment and terminology for further discussion of the preferred embodiments of the present invention.

FIG. 1 illustrates a conventional fluid line connector assembly 10 that includes a length of thin-walled, flexible tubing 20, a flare nut 40 and a flare fitting 60. The length of tubing 20 extends between two tubing edges 24 and has a substantially cylindrical tubing end 22 adjacent each edge 24. Only one end of fluid line connector assembly 10 is shown in FIGS. 1 and 2. Tubing ends 22 include a journal portion 26 and a flare portion 28. The length of thin-walled, flexible tubing 20 has a plurality of helically extending tubing corrugations 30 running between ends 22, and is formed from metal, typically stainless steel. Flexible tubing 20 defines a central axis CA. A braided sheath 32, which surrounds the flexible tubing, extends axially therealong between tubing ends 22. The sheath is secured at each tubing end 22 by an inner collar 34 and a braid retaining collar 36. Typically, the inner collar is fitted onto journal portion 26 of tubing end 22. The sheath extends along at least a portion of inner collar 34, and braid retaining collar 36 is positioned adjacent the sheath radially opposite inner collar 34. Braid retaining collar 36 is crimped or otherwise radially inwardly deformed to compressively retain braided sheath 32 between the two collars.

Flare nut 40 has a threaded end 42 and a strain-relief end 44. An interior passage extends centrally through flare nut 40 between the ends and includes a journal surface 46 and a flare seating surface 48. Journal surface 46 is co-operable with journal portion 26 of tubing end 22 such that the flare nut is freely rotatable about central axis CA of connector assembly 10 as shown by arrows A. Flare seating surface 48 extends radially outwardly from journal surface 46 and axially toward threaded end 42 forming a generally frusto-conical surface. Female fitting threads 50 extend inwardly from threaded end 42 toward flare seating surface 48. The female fitting threads are generally coaxial with journal surface 46. At strain-relief end 44 is an axially-extending, annular recess 54 that extends from the strain-relief end toward the threaded end and is adapted to receive at least a portion of one or more corrugations 30 and also to accommodate inner collar 34, braid retaining collar 36 and at least a portion of braided sheath 32. Wrench flats 52 extend along at least a portion of the exterior of flare nut 40. The flare nut is received on tubing end 22 such that journal surface 46 is generally coaxial with journal portion 26 of tubing end 22, and oriented such that flare seating surface 48 is adjacent flare portion 28 of the tubing end. As indicated by arrow A, in the disassembled condition, flexible tubing 20 and flare nut 40 are rotatable relative to one another.

Flare fitting 60 is shown in FIG. 1 disassembled from tubing 20 and flare nut 40. The flare fitting has a fitting end 62 and a connection end 68. The fitting end has male fitting threads 64 adjacent a flare-engaging surface 66. The connection end includes connection threads 70. Positioned between the fitting end and the connection end of flare fitting 60 are wrench flats 72. A fluid passage 74 extends centrally through flare fitting 60.

FIG. 2 shows male fitting thread 64 of flare fitting 60 engaged with female fitting threads 50 of flare nut 40. As flare fitting 60 is threadably rotated into flare nut 40, flare-engaging surface 66 of the flare fitting advances toward flare portion 28 of flexible tubing 20. Ultimately, flare-engaging surface 66 contacts flare portion 28, which is thereby forced against flare seating surface 48 effecting metal-to-metal contact between the three components. Once such contact has been made, further rotation of the flare fitting into the flare nut causes a metal-to-metal seal to form between flare-engaging surface 66 of the flare fitting and flare portion 28 of the flexible tubing. This metal-to-metal seal is suitable for forming a fluid-tight passage through connector assembly 10. It will be appreciated, however, that this same metal-to-metal contact between the three components prevents rotation of these components relative to one another. As such, it will be appreciated that the entire connector assembly 10 must be rotated to threadably engage connection threads 70 to a fluid line or appliance (not shown).

Figure 3:
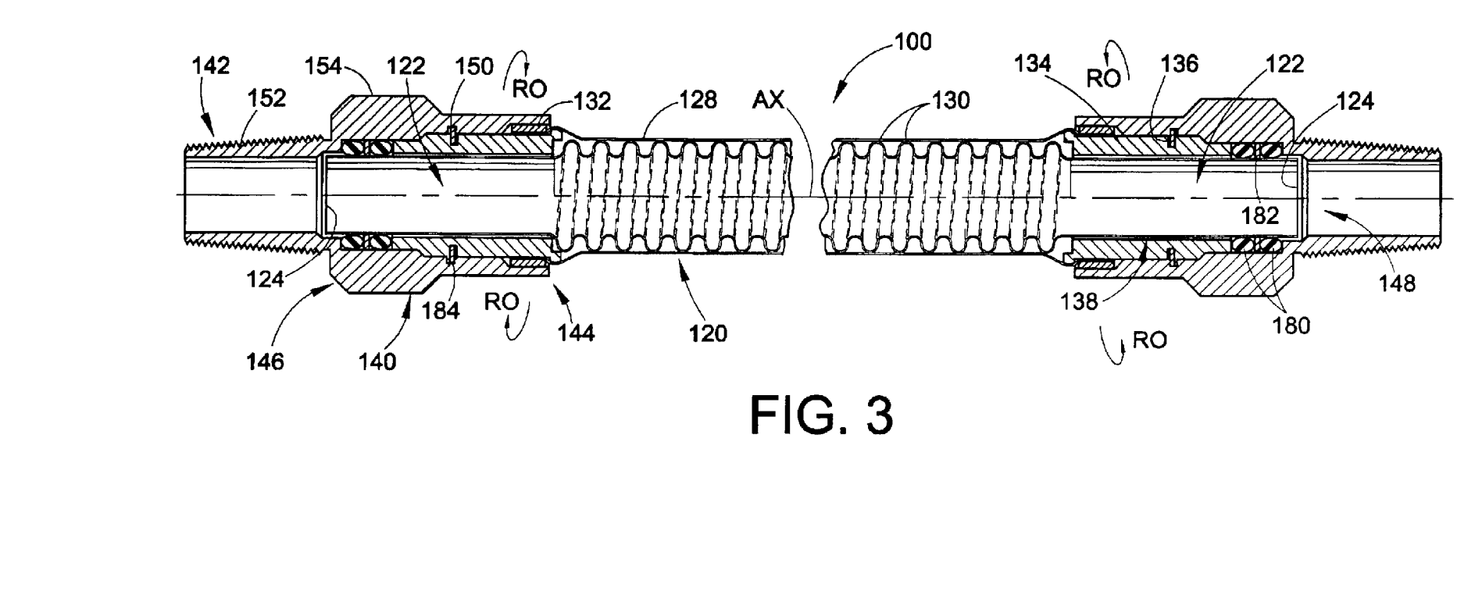
FIG. 3 is a cross-sectional view of a fluid line connector assembly in accordance with the present invention.
Figure 4:
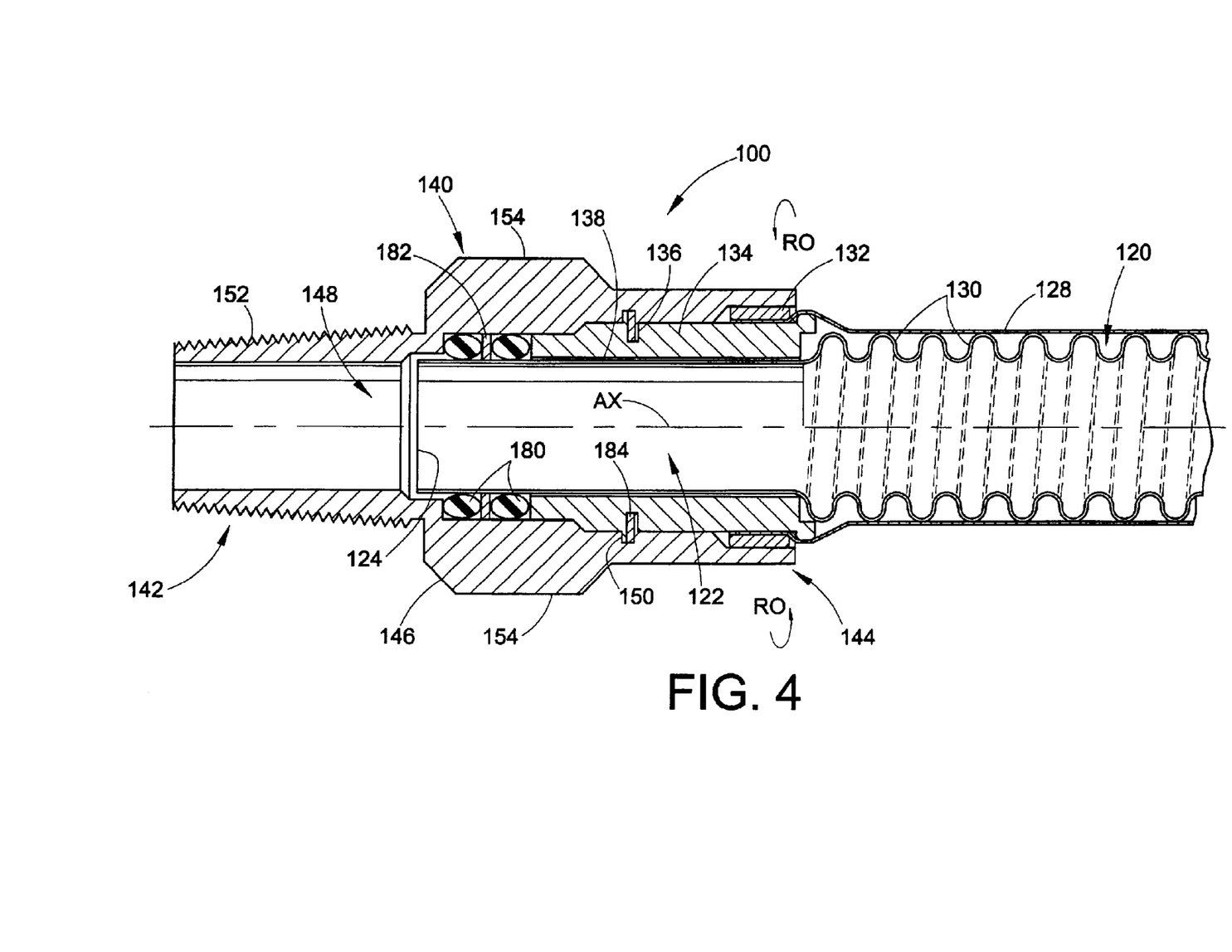
FIG. 4 is a cross-sectional view of one end of the fluid line connector assembly in FIG. 3.

Referring now in greater detail to FIGS. 3–10, wherein the showings are for the purposes of illustrating preferred embodiments of the invention only, and not for the purpose of limiting the invention, FIGS. 3 and 4 illustrate a fluid line connector assembly 100 that includes a length of thin-walled, flexible tubing 120 defining a central axis AX and having opposing tubing ends 122. The length of thin-walled, flexible tubing 120 extends between tubing edges 124 and tubing ends 122 are inwardly adjacent edges 124. The tubing ends are non-corrugated and substantially cylindrical. A plurality of helical corrugations 130 extend along flexible tubing 120 between tubing ends 122. A braided sheath 128 extends along the exterior of flexible tubing 120 between tubing ends 122. A base ring 134 includes a groove 136 extending radially inwardly into the ring and a central passage 138 extending through the base ring. The central passage in each base ring is cooperable with the tubing ends such that each base ring 134 receivingly engages and is supported on a tubing end 122. A portion of braided sheath 128 is captured between base ring 134 and a braid retaining collar 132, which is preferably crimped or otherwise radially inwardly deformed to compressively engage a portion of the braided sheath. An end fitting body 140 is axially retained on each tubing end 122 and remains rotatable thereon as indicated by arrows RO. Two o-rings 180 are compressively positioned between each end fitting 140 and the associated tubing end to form a fluid-tight connection between the end fitting and the tubing end.

As can be better seen in FIG. 4, end fitting body 140 has a threaded end 142 and a receiving end 144. The end fitting body includes an exterior surface 146 and an interior passage 148 that extends generally centrally through body 140 between opposing ends 142 and 144. A groove 150 extends radially outwardly from interior passage 148 into end fitting body 140. End fitting body 140 is positioned on the tubing end such that groove 150 is adjacent groove 136 of base ring 134. A retaining ring 184 is at least partially received in each of the grooves 136 and 150. Two o-rings 180 are compressively positioned between interior passage 148 of body 140 and tubing end 122. The o-rings are separated by a spacer ring 182. As indicated by arrows RO, end fitting body 140 remains rotatable relative to flexible tubing 120 such that torque stresses are not introduced to connector assembly 100 during installation of the connector assembly. Threaded end 142 includes a plurality of male threads 152 extending therealong. The male threads are shown in FIGS. 3 and 4 as being tapered pipe threads. However, it will be appreciated that the threads may take any suitable shape or pitch. It will be further appreciated that female threads (not shown) may be alternatively or additionally included on end fitting body 140. Wrench flats 154 extend along at least a portion of exterior surface 146.

Figure 9:
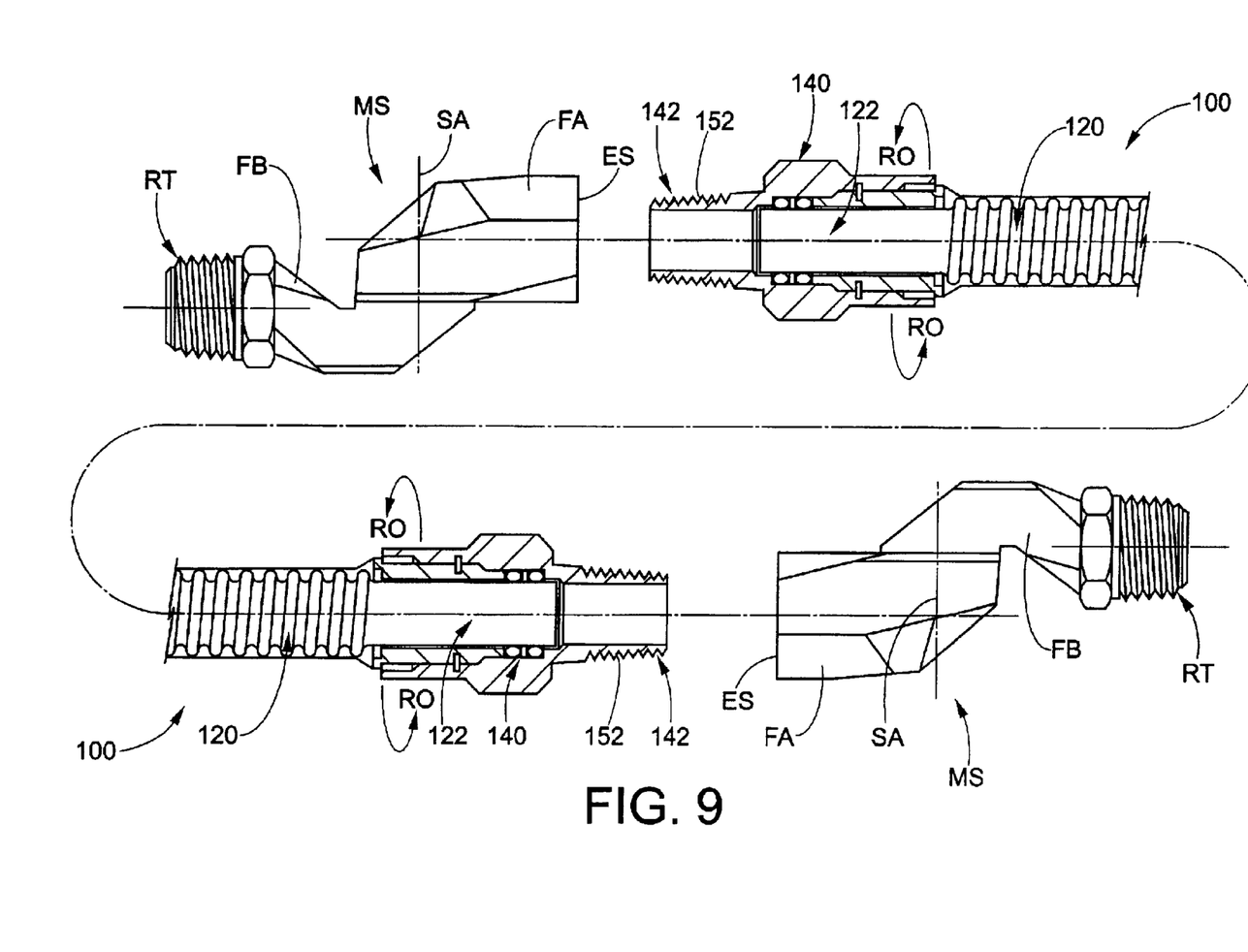
FIG. 9 is a partial cross-sectional view of the fluid line connector assembly shown in FIG. 3 shown with multiplane end fittings.
Figure 10:
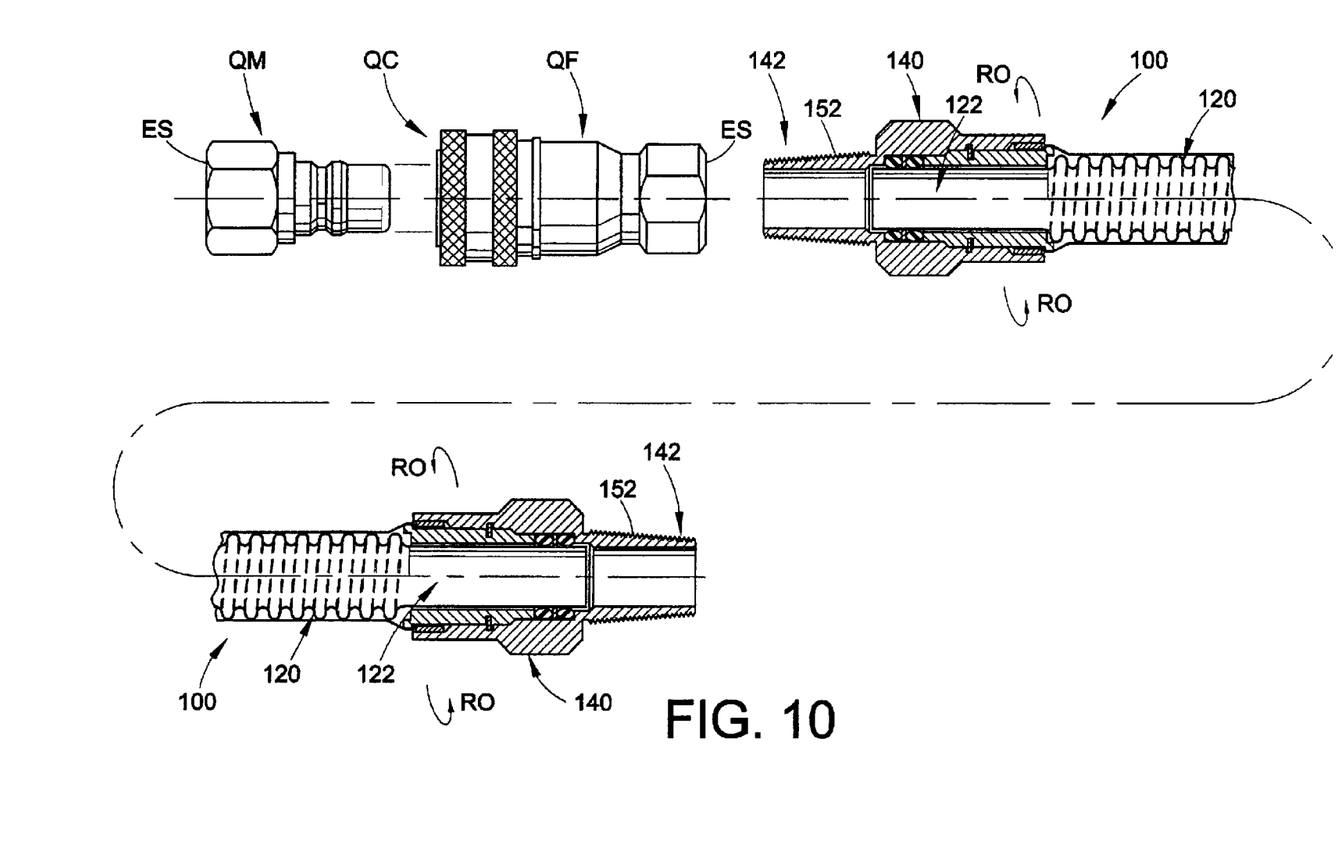
FIG. 10 is a partial cross-sectional view of the fluid line connector assembly shown in FIG. 3 shown with a quick-connect end fitting.

FIGS. 9 and 10 illustrate a fluid line connector assembly 100 prior to assembly with conventional fluid line connectors. More specifically, FIG. 9 illustrates a connector assembly 100 that includes a length of flexible tubing 120 having opposing ends 122 and an end fitting body 140 supported on each tubing end. A multi-plane swivel connector MS is shown prior to assembly with each end fitting body 140. The multi-plane swivel connectors include first and second fitting portions FA and FB. The fitting portions form a fluid-tight connection with one another and are rotatable about a swivel axis SA. First fitting portion FA includes an end surface ES from which female threads (not shown) extend into the fitting portion. The female threads (not shown) are suitable for forming a fluid-tight connection with male threads 152 of threaded end 142. Supported on second fitting portion FB opposite end surface ES of fitting portion FA is a rotatable threaded end RT suitable for forming a fluid-tight connection with a fluid supply line or appliance (not shown).

It will be appreciated that after assembly with the connectors MS, the fitting bodies 140 will remain rotatable as indicated by arrows RO.

FIG. 10 illustrates a fluid line connector assembly 100 with a quick-connect fitting QC adjacent one end thereof. Quick-connect fitting QC includes a male portion QM, and a female portion QF adapted to receive male portion QM and form a fluid-tight connection therewith. Both male portion QM and female portion QF include an end surface ES from which female threads (not shown) extend into each portion of the fitting. The female threads (not shown) are suitable for forming a fluid-tight connection with an associated male thread, such as male threads 152 of threaded end 142 of end fitting body 140 or male threads associated with a fluid supply line or appliance (not shown). It will be appreciated that even after one of the fitting bodies has been assembled with a connector QC, the fitting bodies 140 will remain rotatable relative to flexible tubing 120 as indicated by arrows RO. It will be further appreciated that the multi-plane swivel connector MS illustrated in FIG. 9 and the quick-connect fitting QC shown in FIG. 10 are each known by those skilled in the art, and that other suitable connectors and fittings may be used or such fittings and connectors may be used in other combinations or in combination with one another.

Figure 5:
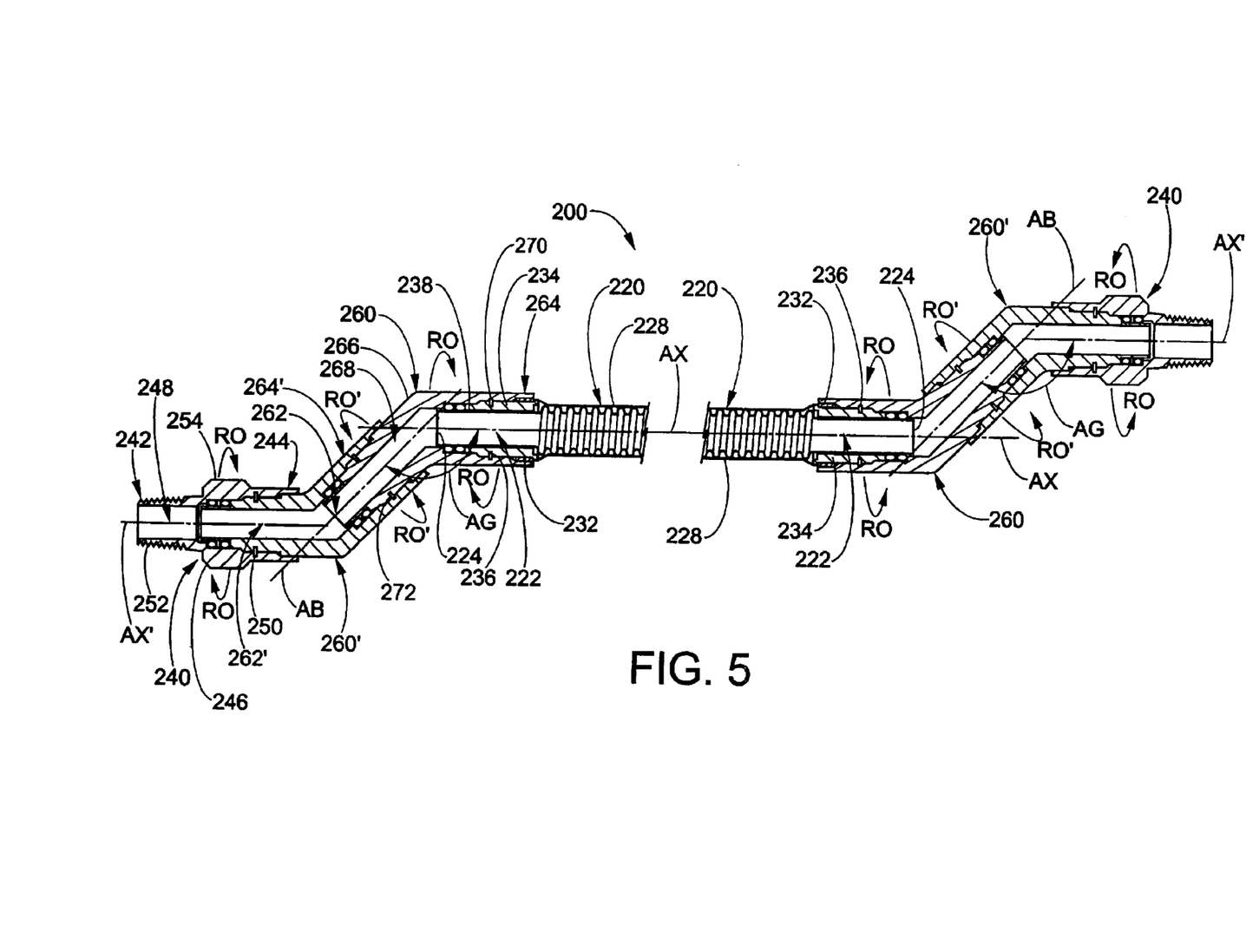
FIG. 5 is a cross-sectional view of an alternate embodiment of a fluid line connector assembly in accordance with the present invention.
Figure 6:
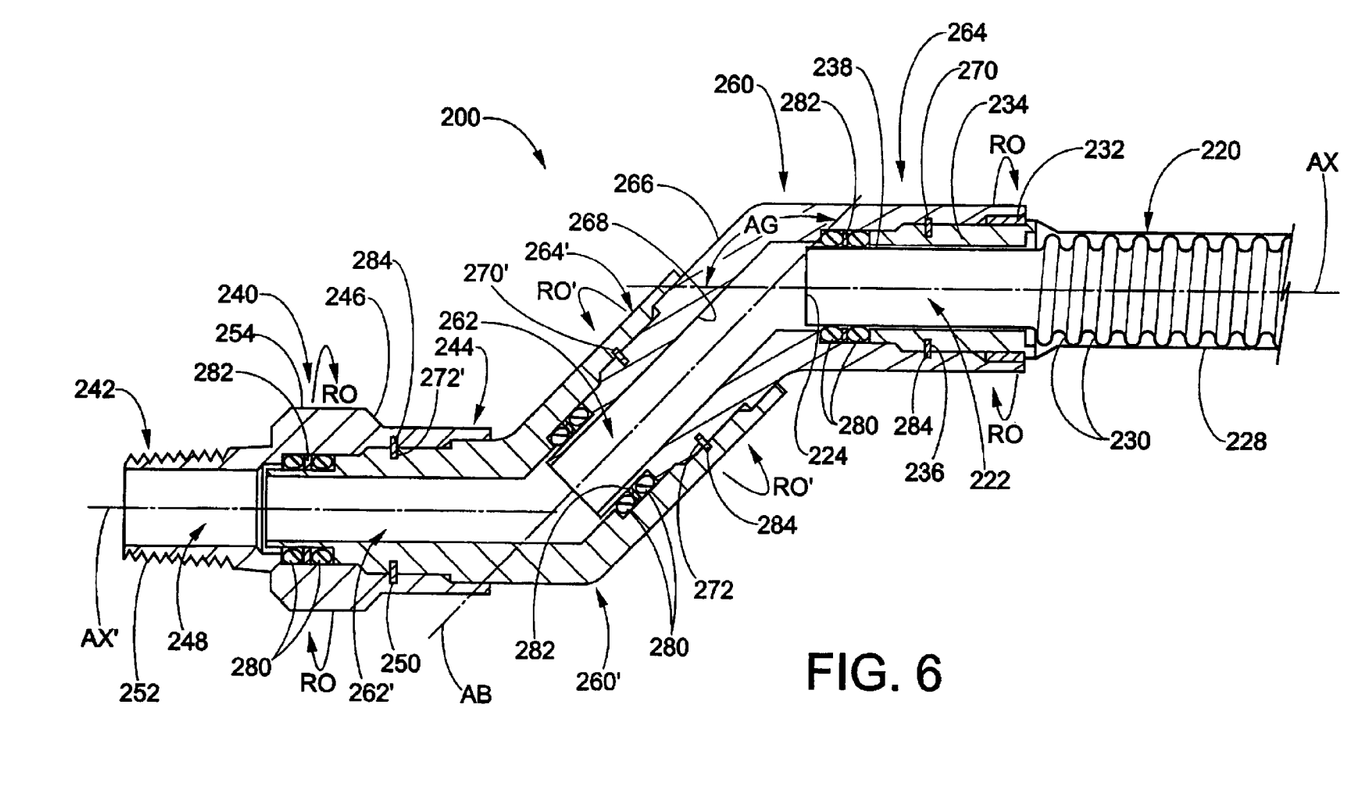
FIG. 6 is a cross-sectional view of one end of the fluid line connector assembly shown in FIG. 5.

FIGS. 5 and 6 illustrate an alternate embodiment of a fluid line connector assembly in accordance with the present invention. Fluid line connector assembly 200 includes a length of flexible tubing 220 that defines an axis AX and that extends between opposing tubing edges 224. A substantially cylindrical tubing end 222 extends inwardly from each tubing edge 224. A braided sheath 228 extends along the exterior of flexible tubing 220 between tubing ends 222. A base ring 234 includes a groove 236 extending radially inwardly into the ring and also includes a central passage 238 extending therethrough. The central passage in each base ring is cooperable with the tubing ends such that each base ring 234 is receivingly engaged and supported on a tubing end 222. A portion of the braided sheath is captured between base ring 234 and a braid retaining collar 232 which is preferably crimped or otherwise radially inwardly deformed to compressively engage a portion of the braided sheath. An angled fitting body 260 is rotatably supported on each tubing end 222 and includes a female end 264 and a male end 262 that extends opposite female end 264 at an angle AG. Angled fitting body 260 has an exterior surface 266 and an interior passage 268. A first groove 270 extends radially outwardly from interior passage 268 into fitting body 260 along female end 264. A second groove 272 extends radially inwardly from exterior surface 266 into fitting body 260 along male end 262. A second angled fitting body 260' is rotatably supported on angled fitting body 260 such that female end 264' of the second angled fitting body receivably engages male end 262 of angled fitting body 260. As indicated by arrows RO', angled fitting body 260' is rotatable about an angled axis AB defined by male end 262 of angled fitting body 260 and which is angled relative to axis AX. A straight end fitting body 240 is rotatably supported on second angled fitting body 260'. Fitting body 240 includes a threaded end 242 and a receiving end 244, and has an exterior surface 246 and an interior passage 248 extending between ends 242 and 244. A groove 250 extends radially outwardly from interior passage 248 into fitting body 240 adjacent receiving end 244. Male threads 252 extend along threaded end 242. Wrench flats 254 extend along at least a portion of exterior surface 246.

As can be better seen in FIG. 6, angled fitting body 260 is positioned along tubing end 222 such that groove 270 of female end 264 is adjacent groove 236 of base ring 234. A retaining ring 284 is at least partially received in each of grooves 236 and 270 to axially retain angled fitting body 260 on flexible tubing 220. Two o-rings 280 are compressively positioned between angled fitting body 260 and tubing end 222. A spacer ring 282 extends between the two o-rings.

Female end 264' of second angled fitting body 260' is positioned along male end 262 of angled fitting body 260 such that groove 270' is adjacent groove 272 of angled fitting body 260. A retaining ring 284 is at least partially received in each grooves 270' and 272 such that second angled fitting body 260 is axially retained on angled fitting body 260 along axis AB. Two o-rings 280 are compressively positioned between female end 264' of second angled end fitting body 260' and male end 262 of angled end fitting body 260. The two o-rings are separated by a spacer ring 282.

Receiving end 244 of straight end fitting body 240 is positioned along male end 262' of second angled fitting body 260' such that groove 250 is adjacent groove 272' of second angled fitting body 260'. A retaining ring 284 is at least partially received in each of grooves 250 and 272' such that straight end fitting body 240 is axially retained on second angled fitting body 260' along axis AX' defined by male end 262'. Two o-rings 280 are compressively positioned between straight end fitting body 240 and male end 262' of second angled fitting body 260'. A spacer ring 282 is positioned between the pair of o-rings.

Angle AG between axes AX and AB, and AB and AX' in FIGS. 5 and 6 is shown as being about 45 degrees. However, it will be appreciated that any suitable angle may be used. It will be further appreciated that even after assembly and installation, angled fitting bodies 260 and straight fitting bodies 240 will remain respectively rotatable about axes AX and AX' as indicated by arrows RO, and that angled fitting body 260' will remain rotatable relative to angled fitting body 260 about axis AB as indicated by arrows RO'.

Figure 7:
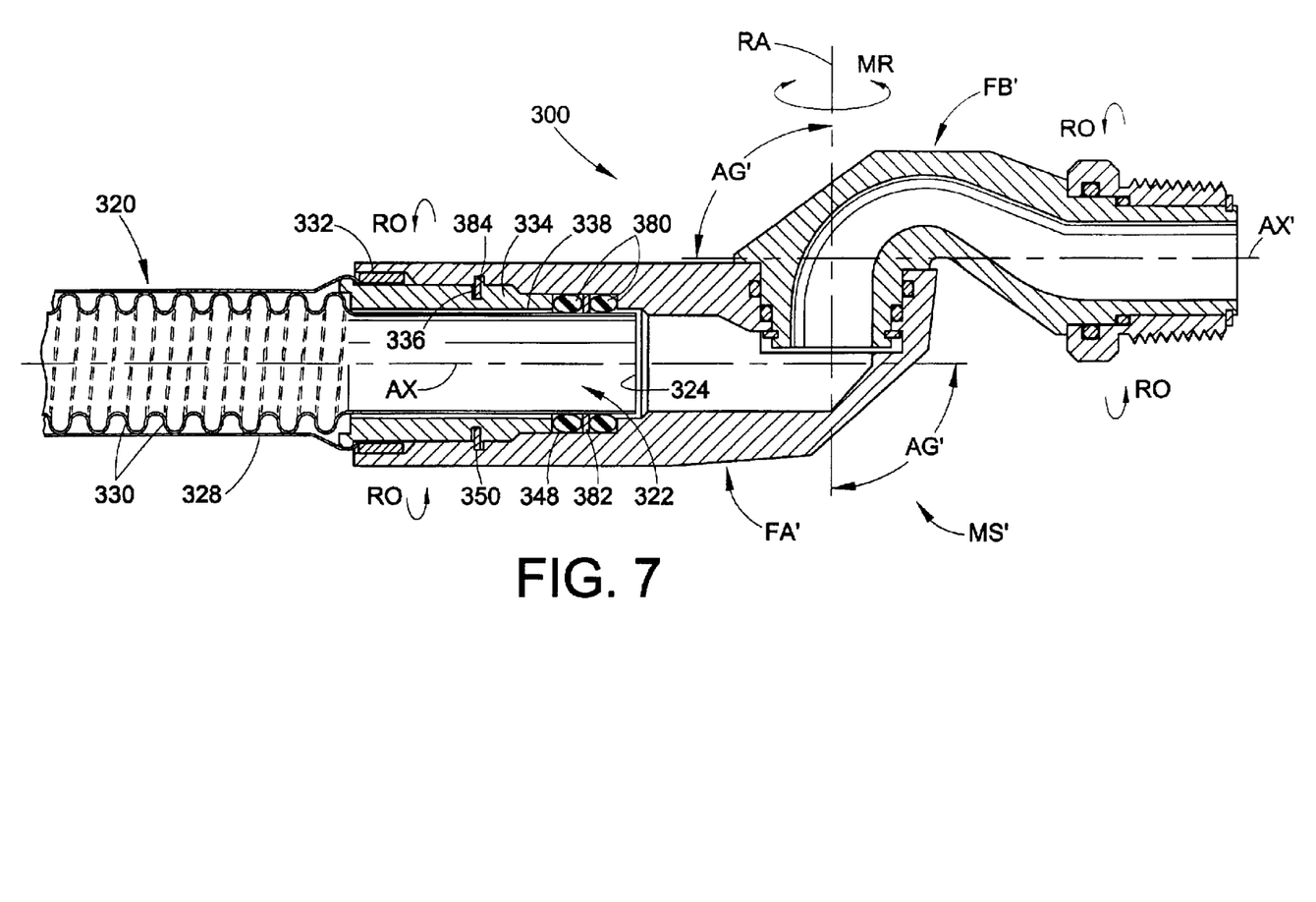
FIG. 7 is a cross-sectional view of one end of another alternate embodiment of a fluid line connector assembly in accordance with the present invention.

FIG. 7 illustrates another embodiment of a fluid line connector assembly in accordance with the present invention. Fluid line connector assembly 300 includes a length of flexible tubing 320 extending between tubing edges 324 and defining a central axis AX. The flexible tubing also having a substantially cylindrical tubing end 322 extending axially inwardly from each tubing edge 324. A plurality of helical corrugations 330 extend along flexible tubing 320 between tubing ends 322. A braided sheath 328 extends along the exterior of the flexible tubing between tubing ends 322. A base ring 334 includes a groove 336 extending radially inwardly into the ring and a central passage 338 extending through the base ring. The central passage in each base ring is cooperable with the tubing ends such that each base ring 334 is receivingly engaged and supported on a tubing end 322. A portion of braided sheath 328 is captured between base ring, 334 and a braid retaining collar 332, which is preferably crimped or otherwise radially inwardly deformed to compressively engage a portion of the braided sheath.

An otherwise conventional multi-plane swivel connector MS', having fitting portions FA' and FB', is operatively associated with the foregoing tubing and end connections. In place of the conventional female threads (not shown) normally found in fitting portion FA' of multi-plane swivel connector MS' is an interior surface 348 adapted to receivingly engage tubing end 322, base ring 334 and braid retaining collar 332. A groove 350 extends radially outwardly from interior passage 348 into fitting portion FA'. The fitting portion is positioned along the tubing end such that groove 336 of base ring 334 is adjacent groove 350. A retaining ring 384 is at least partially received in each of grooves 336 and 350 axially retaining multi-plane swivel connector MS' on flexible tubing 320. Two o-rings 380 are compressively positioned between interior passage 348 of fitting portion FA' and tubing end 322. A spacer ring 382 extends between the pair of o-rings.

Fitting portion FB' is supported on fitting portion FA' and forms a fluid-tight seal therewith. Fitting portion FB' defines an axis AX', and is rotatable relative to fitting portion FA' about an axis RA as indicated by arrow MR. Angle AG' between axes AX and RA, and RA and AX' is shown in FIG. 7 as being about 90 degrees. However, it will be appreciated any suitable angle may be used. It will be further appreciated that fitting portion FA' remains rotatable even after assembly as indicated by arrows RO, and that the threaded end portion of fitting portion FB' is also rotatable as indicated by arrows RO.

Figure 8:
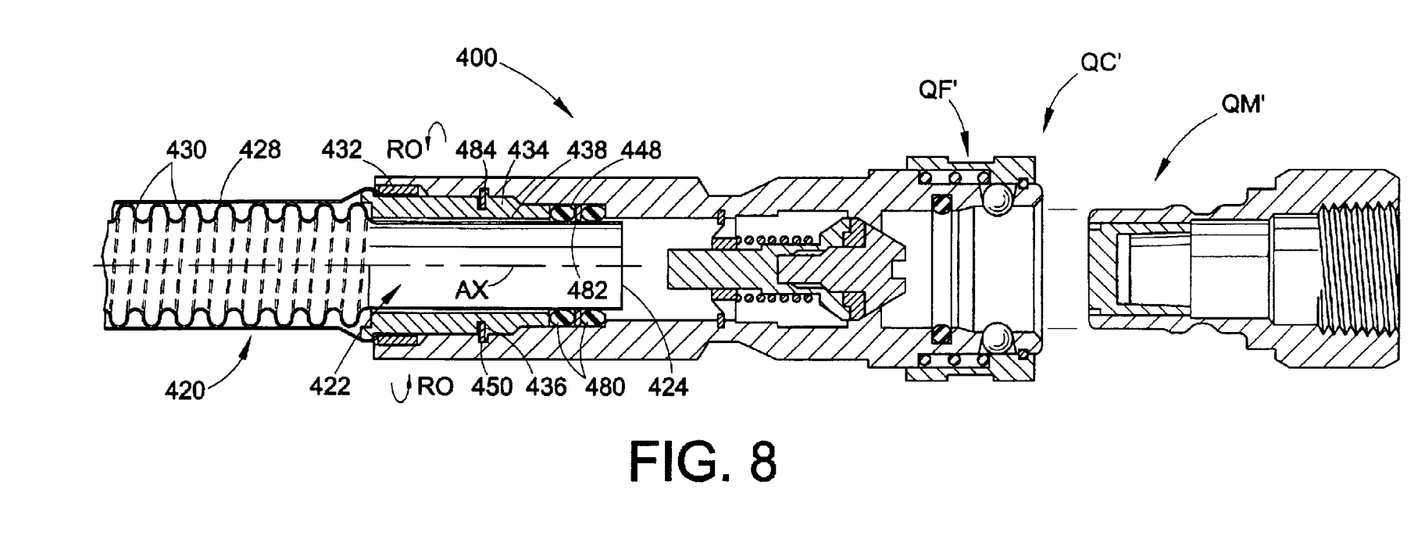
FIG. 8 is a cross-sectional view of one end of a further alternate embodiment of a fluid line connector assembly in accordance with the present invention.

A further embodiment of a fluid line connector assembly in accordance with the present invention is illustrated in FIG. 8. Fluid line connector assembly 400 includes a length of thin-walled, flexible tubing 420 defining a central axis AX and having opposing tubing ends 422. The length of thin-walled, flexible tubing 420 extends between tubing edges 424 such that tubing ends 422 are inwardly adjacent the edges. The tubing ends are preferably non-corrugated and substantially cylindrical. A plurality of helical corrugations 430 extend along flexible tubing 420 between tubing ends 422. A braided sheath 428 extends along the exterior of flexible tubing 420 between tubing ends 422. A base ring 434 includes a groove 436 extending radially inwardly into the ring and a central passage 438 extending through the base ring. The central passage in each base ring is cooperable with the tubing ends such that each base ring 434 is receivingly engaged and supported on a tubing end 422. A portion of braided sheath 428 is captured between base ring 434 and a braid retaining collar 432, which is preferably crimped or otherwise radially inwardly deformed to compressively engage a portion of the braided sheath.

An otherwise conventional quick-connect fitting assembly QC', having a male portion QM' and a female portion QF' adapted to receivingly engage male portion QM' and form a fluid-tight seal therewith, is operatively associated with the foregoing tubing and end configuration. In place of the conventional female threads (not shown) normally found in female portion QF' of the quick-connect fitting assembly QC' is an interior surface 448 from which a groove 450 extends radially outwardly into the female portion. Interior surface 448 is cooperable with tubing end 422, base ring 434 and braid retaining collar 432 such that female portion QF' is receivingly engaged thereon. Groove 450 of female portion QF' is positioned adjacent groove 436 in base ring 434. A retaining ring 484 is at least partially received in each of grooves 436 and 450 such that female portion QF' is axially retained on flexible tubing 420. A pair of o-rings 480 are compressively positioned between interior surface 448 and tubing 422. A spacer ring 482 extends between the pair of o-rings. It will be appreciated that female portion QF' remains rotatable even after assembly, as indicated by arrows RO.

It will be appreciated that o-rings 180, 280, 380 and 480 illustrate a sealing member suitable for forming a fluid-tight seal between the associated components. It is intended that the o-rings be representative of the sealing members, but that the sealing members not be limited thereto. As such, any suitable sealing member may be used, such as lip seals, quattro seals and square gaskets, for example.

While the invention has been described with reference to the preferred embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of the appended claims or the equivalent thereof.

What is claimed is:

1. A fluid line connector assembly comprising:
    a length of flexible tubing having a generally cylindrical tubing end;
    a base ring having a pair of opposing ends, an outside surface, an inside bore extending therethrough between said pair of opposing ends, and a base ring first groove in said outside surface extending radially into said base ring, said base ring supported on said flexible tubing such that said bore is adjacent said tubing end;
    a braided sheath extending axially along the exterior of said length of flexible tubing and along at least a portion of said outside surface of said base ring;
    a braid retaining collar having a pair of opposing ends and an inside surface extending between said ends, said braided sheath being compressively positioned between at least a portion of said inside surface of said braid retaining collar and said portion of said outside surface of said base ring;
    an end fitting body having a pair of opposing ends, an exterior surface, an interior passage extending through said body between said opposing ends, and an end said tubing end such that said end fitting body first groove of said interior passage is adjacent said base ring first groove of said base ring;
    a retaining ring at least partially captured within each of said base ring first groove and said end fitting body first groove; and,
    a sealing member compressively associated between said end fitting body and said tubing end.

2. The fluid line connector of claim 1, wherein said end fitting body includes a portion of a quick-connect end fitting.

3. The fluid line connector of claim 1, wherein said end fitting body includes a portion of a multi-plane swivel connector.

4. The fluid line connector assembly of claim 1, wherein said end fitting body includes a threaded end and a base end opposite said threaded end.

5. The fluid line connector assembly of claim 4, wherein said threaded end includes a plurality of male threads.

6. The fluid line connector assembly of claim 4, wherein said threaded end includes tapered pipe threads.

7. The fluid line connector assembly of claim 4, further comprising a quick-connect end fitting threadably supported on said threaded end.

8. The fluid line connector assembly of claim 4, further comprising a multi-plane swivel connector threadably supported on said threaded end.

9. The fluid line connector assembly of claim 1, wherein said end fitting body is a first end fitting body and includes a male connector portion and a female connector portion, said female connector portion includes said first end fitting body first groove and is positioned on said tubing end such that said first end fitting body first groove is adjacent said base ring first groove of said base ring, said male portion extends at an angle from said female portion and includes a first end fitting body second groove extending radially into said first end fitting body from said exterior surface.

10. The fluid line connector assembly of claim 9 further comprising a second end fitting body, a second retaining ring and a second sealing member, said second end fitting body including a pair of opposing ends, an exterior surface, an interior passage extending through said second end fitting body between said opposing ends, and a second end fitting body first groove extending radially outwardly into said second end fitting body from said interior passage, said interior passage of said second end fitting body receivingly engaging said male connector portion of said first end fitting body such that said first end fitting body second groove is adjacent said second end fitting body first groove, said second retaining ring at least partially captured within each of said first end fitting body second groove and said second end fitting body first groove, and said second sealing member compressively associated between said interior passage of said second end fitting body and said male connector portion of said first end fitting body.

11. The fluid line connector assembly of claim 10, wherein said second end fitting body includes a male connector portion and a female connector portion, said female portion receivingly engaging said male connector portion of said first end fitting body, said male connector portion of said second end fitting body extending at an angle from said female connector portion and including a second end fitting body second groove extending radially into said second end fitting body from said exterior surface.

12. The fluid line connector assembly of claim 11, further comprising a third end fitting body, a third retaining ring and a third sealing member, said third end fitting body including a pair of opposing ends, an exterior surface, an interior passage extending through said third end fitting body between said opposing ends, and a third end fitting body first groove extending radially outwardly into said third end fitting body from said interior passage, said interior passage of said third end fitting body receivingly engaging said male connector portion of said second end fitting body such that said second end fitting body second groove is adjacent said third end fitting body first groove, said third retaining ring at least partially captured in each of said second end fitting body second groove and said third end fitting body first groove, and said third sealing member compressively associated between said interior passage of said third end fitting body and said male connector portion of said second end fitting body.

13. The fluid line connector assembly of claim 12, wherein said third end fitting body includes a threaded end opposite said second end fitting body.

14. The fluid line connector assembly of claim 13, wherein said threaded end includes a plurality of male threads.

15. The fluid line connector assembly of claim 13, wherein said threaded end includes tapered pipe threads.

16. A fluid line connector assembly comprising:
    a length of flexible tubing having a generally cylindrical tubing end;
    a base ring supported on said tubing end and having a base ring first groove;
    a sheath extending along the exterior of said length of flexible tubing and along at least a portion of said base ring;

a retaining collar positioned along said tubing end such that said sheath is compressively positioned between at least a portion of said retaining collar and said portion of said base ring;

an end fitting body having an end fitting body first groove, said end fitting body positioned along said tubing end such that said end fitting body first groove is adjacent said base ring first groove of said base ring;

a retaining ring at least partially captured within each of said base ring first groove and said end fitting body first groove; and, a sealing member compressively associated between said end fitting body and said tubing end.

17. The fluid line connector assembly of claim 16, wherein said end fitting body is a first end fitting body and includes a proximal portion and a distal portion, said proximal portion includes said first end fitting body first groove and is positioned on said tubing end such that said first end fitting body first groove is adjacent said base ring first groove of said base ring.

18. The fluid line connector assembly of claim 17, wherein said distal portion extends at an angle from said proximal portion and includes a first end fitting body second groove.

19. The fluid line connector assembly of claim 18 further comprising a second end fitting body, a second retaining ring and a second sealing member, said second end fitting body having a second end fitting body first groove, said second end fitting body receivingly engaging said first end fitting body such that said first end fitting body second groove is adjacent said second end fitting body first groove, said second retaining ring at least partially captured within each of said first end fitting body second groove and said second end fitting body first groove, and said second sealing member compressively associated between said second end fitting body and said first end fitting body.

20. The fluid line connector assembly of claim 19, wherein said second end fitting body includes a proximal portion and a distal portion, said distal portion of said second end fitting body extending at an angle from said proximal portion and including a second end fitting body second groove.

21. The fluid line connector assembly of claim 20, further comprising a third end fitting body, a third retaining ring and a third sealing member, said third end fitting body having a third end fitting body first groove, said third end fitting body receivingly engaging said second end fitting body such that said second end fitting body second groove is adjacent said third end fitting body first groove, said third retaining ring at least partially captured in each of said second end fitting body second groove and said third end fitting body first groove, and said third sealing member compressively associated between said third end fitting body and said second end fitting body.

22. The fluid line connector assembly of claim 16, wherein said end fitting body includes a portion of a quick-connect end fitting.

23. The fluid line connector assembly of claim 16, wherein said end fitting body includes a portion of a multi-plane swivel connector.

24. The fluid line connector assembly of claim 16, wherein said end fitting body includes a threaded end.

25. The fluid line connector assembly of claim 24 further comprising a quick-connect end fitting threadably supported on said threaded end.

26. The fluid line connector assembly of claim 24 further comprising a multi-plane swivel connector threadably supported on said threaded end.

27. A fluid line connector assembly comprising:

a length of flexible tubing having a tubing end;

a base ring supported on said tubing end and having a first groove;

a sheath extending along at least a portion of each of said length of tubing and said base ring;

a retaining collar securing said sheath to said base ring;

an end fitting body having a second groove and supported on said tubing end such that said second groove is adjacent said first groove;

a retaining ring at least partially engaging each of said first and second grooves; and, a sealing member compressively positioned between said end fitting body and said tubing end with said sealing member in sealing relation with at least one of said end fitting body and said tubing end.

28. The fluid line connector of claim 27, wherein said sealing member includes a plurality of o-rings each in sealing relation with at least one of said end fitting body and said tubing end.

29. A fluid line connector assembly comprising:

a length of flexible tubing having a tubing end;

a base ring supported on said tubing end and having a first groove, an inside wall and an outside wall, said inside wall is dimensioned to slidingly receive said tubing end, and said first groove is disposed on said outside wall;

a sheath extending along at least a portion of each of said length of tubing and said base ring;

a retaining collar securing said sheath to said base ring;

an end fitting body having a second groove and supported on said tubing end such that said second groove is adjacent said fist groove;

a retaining ring at least partially engaging each of said first and second grooves; and a sealing member in sealing relation with at least one of said end fitting body and said tubing end.

30. The fluid line connector of claim 29, wherein said sheath is a braided sheath.

31. The fluid line connector of claim 29, wherein said retaining collar includes an inside wall, and said sheath is compressively positioned between said inside wall of said retaining collar and said outside wall of said base ring.

32. The fluid line connector of claim 29, wherein said end fitting body includes a threaded end.

* * * * *